BOYD & TYLER.

Breech Loader.

No. 3,245. Reissued Dec. 29, 1868.

Witnesses:

J. H. Adams

N. S. G. Wilde

Inventors:

Francis C. Boyd

P. S. Tyler

N. PETERS, Photo-Lithographer, Washington, D. C.

UNITED STATES PATENT OFFICE.

FRANCIS E. BOYD AND P. S. TYLER, OF BOSTON, MASSACHUSETTS.

IMPROVEMENT IN BREECH-LOADING FIRE-ARMS.

Specification forming part of Letters Patent No. 73,494, dated January 21, 1868; Reissue No. 3,245, dated December 29, 1868.

*To all whom it may concern:*

Be it known that we, FRANCIS E. BOYD and P. SHELTON TYLER, of Boston, in the county of Suffolk and State of Massachusetts, have invented a new and useful Improvement in Breech-Loading Double-Barreled Guns; and we do hereby declare that the following is a full, clear, and exact description of the same, reference being had to the accompanying drawings, making a part of this specification, in which—

Figure 1:
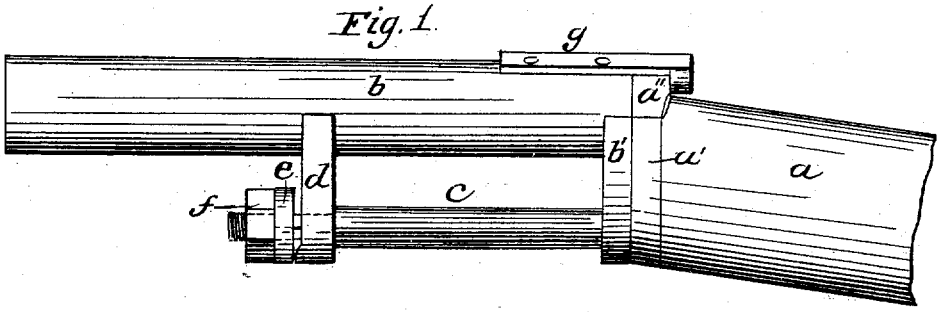
Figure 2:
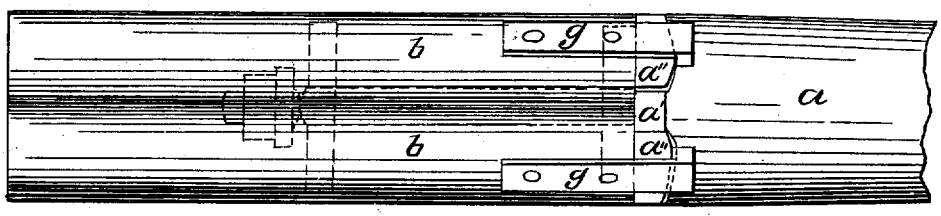
Figure 4:
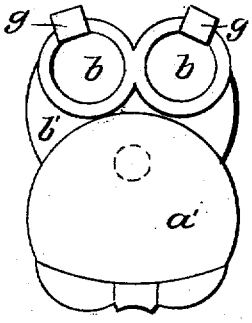
Figure 3:
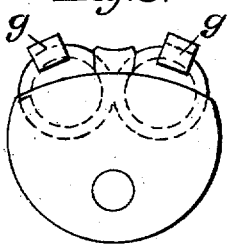
Figure 5:
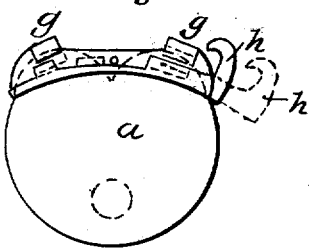
Figure 6:
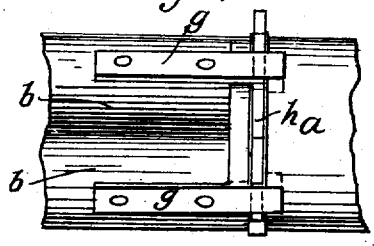

Figure 1 represents a side elevation of a portion of a double-barreled gun embodying our invention. Fig. 2 is a plan view of the same. Fig. 3 is a section of the rear of the breech when closed. Fig. 4 is a view of the breech when opened, and Figs. 5 and 6 are modifications of our invention.

The object of our invention is to provide a simple and efficient means for securing the barrels of a breech-loading gun to the breech, and at the same time to enable the barrels to be readily turned upon the breech for loading; and the invention consists in the employment of clamps fitting over cam-shaped projections that serve to tighten up the clamps as they pass over them.

The invention also consists of a washer or plate attached to the spindle upon which the barrels turn, the said washer being formed with a curved portion on one side, that bears against a raised portion on one side of the plate through which the spindle passes, and which is attached to the under side of the barrels.

Referring to the drawings, *a* represents the stock, and *b b* the barrels, of a double-barreled gun. To the under side of the barrels are attached the plates *b′ d*, which support the spindle *c*, and in which the said spindle freely turns. The spindle *c* is firmly attached to the breech-plate *a′*. To the rear of each barrel is attached a clamp, *g*, the same consisting of a strip or plate of metal, formed with a projection at its rear end, fitting over a lip upon the face-plate *a′*, the latter being attached to the front end of the stock *a*. The edges of the face-plate *a′* project above the stock, so as to form two lips, which are curved to correspond with the surface of the barrels, so as to fit snugly under the projecting clamps *g g*. These lips are curved in the rear on each side, as shown at *a″ a″* in Figs. 1 and 2, so that as the projecting ends of the clamps are brought over them the barrels will be drawn up close to the face-plate *a′* and form a tight joint. On the end of the spindle *c*, in front of the bearing-plate *d*, is a circular disk or washer, *e*, confined by a nut, *f*. The said washer turns with the spindle, being so fitted to it as to be moved forward by the nut—an adjustment which may be required if the cams are worn by use—and is formed with a cam-like projection on one side, which is made to abut against a similar projection on the front side of the bearing-plate *d*, when the barrels are closed upon the breech, and thus form an additional bearing-point for securing a tight joint of the barrels upon the breech. The curves shown in the drawings on the rear of the breech-plate and on the washer and plate *d* are exaggerated for the purpose of more fully explaining their operation; but curves of less projection from the plane surfaces will answer all purposes, one sixty-fourth of an inch, ($\frac{1}{64}$,) or even less, being sufficient. When the gun is held by the barrels, a twist given to the breech will relieve the cams from the clamps, thus freeing the breech-plate from pressure, so that the parts can be turned easily to a position suitable for loading. When loaded, the parts can be turned until the cams engage with the clamps, which will bring the barrels in place for firing. (It is obvious that the barrels can be thrown either to the right or left.)

When in position, the barrels may be prevented from turning by means of a spring-catch or other suitable device. The clamps *g g*, instead of being secured to the barrels, as above described, may be reversed and attached to the stock, their projecting ends engaging cams attached to the barrels and yet retain some of the beneficial features of our invention; but we regard their attachment to the barrels as much the more preferable.

Figs. 5 and 6 show a modification of our invention as adapted to barrels which slide longitudinally on the spindle, instead of turning on the spindle at one side for the insertion of the charge. The barrels are secured in a closed position by means of a sliding plate on which are formed cams or projections, which engage with the projecting ends of the clamps, in a manner similar to the action of the face-plate, before described.

We do not claim as new a gun made to turn upon a spindle, nor a gun turning on a spindle and having a single clamp projecting from the breech-plate, which clamps upon a lip projecting from the barrel, as we are aware that such a gun has heretofore been patented; but, as far as we know, no gun, whether single or double barreled, has ever before been made having the clamps attached to the barrels and projecting backward over a suitable breech-plate; nor has a double-barreled gun ever been made with a clamp which did not lie in the line of sight, or with more than one clamp. In a double-barreled spindle-gun it is also important that the breech can be opened on either side of the stock—that is, that the barrels can be thrown to the right or left at pleasure—and, so far as we know, we are the first to make such a gun.

Having thus described our invention, what we claim as new, and desire to secure by Letters Patent, is—

1. A breech-piece having lips upon its upper part, in combination with clamps attached to the barrels and projecting backward over the breech-piece, substantially as and for the purpose specified.

2. The combination of the clamps *g g*, whether attached to the barrels or breech-piece, and the curved and cam projections on which they clamp, with the bearing-plate *d* and plate or disk *e*, constructed and operating substantially as and for the purpose set forth.

3. Two clamps, *g g*, whether attached to the barrels or breech-piece, in combination with two cam projections on which they clamp, and with two barrels arranged to turn upon a suitable spindle, the whole being arranged so that the barrels can be thrown either to the right or to the left, all substantially as described.

4. The plate or washer *e*, formed as described, and attached to the spindle *c*, in combination with the raised or cam-shaped surface of the bearing-plate *d*, as set forth.

FRANCIS E. BOYD.
P. S. TYLER.

Witnesses:
J. E. MAYNADIER,
CHAS. F. SLEEPER.